United States Patent [19]

Kaule et al.

[11] Patent Number: 4,598,205

[45] Date of Patent: Jul. 1, 1986

[54] SECURITY PAPER WITH AUTHENTICITY FEATURES IN THE FORM OF SUBSTANCES LUMINESCING ONLY IN THE INVISIBLE REGION OF THE OPTICAL SPECTRUM AND PROCESS FOR TESTING THE SAME

[75] Inventors: Wittich Kaule, Gauting; Gerhard Stenzel, Munich, both of Fed. Rep. of Germany

[73] Assignee: GAO Gesellschaft für Automation und Organisation mbH, Fed. Rep. of Germany

[21] Appl. No.: 586,963

[22] Filed: Mar. 7, 1984

Related U.S. Application Data

[62] Division of Ser. No. 314,842, filed as PCT DE81/00081 on May 29, 1981, published as WO81/03510 on Dec. 10, 1981, Pat. No. 4,451,521.

[30] Foreign Application Priority Data

May 30, 1980 [DE] Fed. Rep. of Germany ....... 3020599

[51] Int. Cl.$^4$ .......................... F21V 9/16; G01N 21/64
[52] U.S. Cl. .............................. 250/458.1; 250/461.1; 283/87
[58] Field of Search ................... 250/338 R, 341, 372, 250/461.1, 458.1, 459.1, 556, 557; 283/87, 88, 89, 91, 92; 356/71

[56] References Cited

U.S. PATENT DOCUMENTS

| | | |
|---|---|---|
| 2,704,634 | 3/1955 | Rauch . |
| 3,208,009 | 9/1965 | Etzel et al. . |
| 3,412,245 | 11/1968 | Halverson . |
| 3,447,851 | 6/1969 | Remeika et al. . |
| 3,455,577 | 7/1969 | Kikumoto et al. . |
| 3,473,027 | 10/1969 | Freeman et al. . |
| 3,480,877 | 11/1969 | Dillon et al. . |
| 3,525,698 | 8/1970 | Leto et al. . |
| 3,533,176 | 11/1970 | Weitzbert et al. . |
| 3,654,463 | 4/1972 | Geusic . |
| 3,663,813 | 5/1972 | Shaw . |
| 3,928,226 | 12/1975 | McDonough et al. . |
| 4,015,131 | 3/1977 | McDonough et al. . |
| 4,047,033 | 9/1977 | Malmberg et al. . |
| 4,056,731 | 11/1977 | Bayha ................................ 250/556 |
| 4,066,280 | 1/1978 | LaCapria . |
| 4,122,349 | 10/1978 | Fouassier et al. . |
| 4,128,674 | 12/1978 | Hedler . |
| 4,146,792 | 3/1979 | Stenzel . |
| 4,152,483 | 5/1979 | Kanda et al. . |
| 4,202,491 | 5/1980 | Suzuki ................................ 235/468 |
| 4,215,289 | 7/1980 | DeHair et al. . |
| 4,222,662 | 9/1980 | Kruegle ................................ 283/88 |
| 4,246,128 | 1/1981 | Gallagher et al. . |

FOREIGN PATENT DOCUMENTS

| | | |
|---|---|---|
| 1186253 | 4/1970 | United Kingdom . |
| 1326665 | 8/1973 | United Kingdom . |
| 1484471 | 9/1977 | United Kingdom . |
| 2013233 | 8/1979 | United Kingdom . |
| 2035208 | 6/1980 | United Kingdom . |

OTHER PUBLICATIONS

Dieke, "Spectra & Energy Levels of Rare Earth Ions in Crystals"; Interscience, N.Y. 1968, Chapt. 13, p. 189 ff.
Auzel, Francois, "Materials and Devices Using Double-Pumped Phorphors with Energy Transfer", Proceedings of the IEEE, vol. 61, 6 (1973), p. 769.
Miyazoe, Yasushi et al, "Stimulated Emission from 19 Polymethine Dyes–Laser Action Over the Continuous Range 710–1060 m$\mu$", Applied Physics Letter, vol. 12, 1968, p. 206ff.
Fant, W. J. et al, "Infrared Transparent Credit Card", IBM Technical Disclosure Bulletin, vol. 9, No. 7, 1966.

*Primary Examiner*—Janice A. Howell
*Attorney, Agent, or Firm*—Robert J. Koch

[57] ABSTRACT

Security paper with luminescing authenticity characteristics which after excitation with invisible light emit exclusively invisible light of different wavelengths as authenticity signal. The luminophores can be included in the printing ink used or they can be added to the paper material in the manufacture of the paper material. A corresponding test apparatus makes it possible to check the authenticity of the security paper in the presence of customers but unnoticed by them; thereby the invisibility of the test signal and the authenticity signal are taken advantage of and the test device is hidden behind a plate non-transmissive for visible light which however is transmissive for the test signal and for the authenticity signal.

17 Claims, 5 Drawing Figures

SECURITY PAPER WITH AUTHENTICITY FEATURES IN THE FORM OF SUBSTANCES LUMINESCING ONLY IN THE INVISIBLE REGION OF THE OPTICAL SPECTRUM AND PROCESS FOR TESTING THE SAME

This is a division of application Ser. No. 314,842 filed as PCT DE81/00081 on May 29, 1981, published as WO81/03510 on Dec. 10, 1981, Pat. No. 4,451,521, Oct. 23, 1981, now U.S. Pat. No. 4,451,521.

BACKGROUND OF THE INVENTION

The invention relates to a security paper with luminescing authenticity features as well as to a process for testing such a security paper.

Under the term "security paper" are here to be understood bank notes, check forms, shares and stamps as well as passes, credit cards, check cards, passports, air tickets and other certificates and documents.

In order to prevent forgeries and counterfeiting, it has been attempted for a long time to construct security papers which ought to be protected such that unauthorised persons cannot undetectably change or reproduce them.

Accordingly in the past particularly those security methods have recommended themselves the features of which on the one hand can be tested for authenticity umambiguously by anyone without technical assistance and without particular technical knowledge, but which for the manufacture of the feature make necessary such a high degree of a workman's technical skill that the forger is not in the position professionally subsequently to carry out the manufacturing process.

Particularly in the case of bank notes providing these with genuine water marks and with security threads has proved of value, since these can only be undertaken during paper manufacture by means of expensive equipment. Security features of comparable value are extremely fine, and accordingly technically very demanding, steel gravure patterns.

For some time a strong trend to automation in international money transactions has been evident. Accordingly it has emerged that the authenticity features used up till now are not suited to the same degree for automatic testing. Because the checking machinery does not look at the whole of the security paper presented for testing, it is easier to deceive by imitations than the human senses for which these features were designed. Thereby it becomes necessary additionally to the noted visually testable authenticity features to create further ones which can be detected by automatic testers with comparable security.

Printed forgeries accordingly become more difficult to make if the features provided for an automatic testing cannot be registered by the human senses.

In the meantime in the patent literature a series of optical, electrical and magnetic features have been suggested for rendering security papers secure and suited to machine reading. These authenticity characteristics are suitable for testing in devices such as e.g. cash dispensers; these features cannot, however, be unnoticed by the customer and checked without this being seen at the bank counter and in comparable situations.

In the case of security papers with magnetic security threads one is forced, as overall with magnetically effective features, to position the document exactly in the checking apparatus and to make on both sides close contact with the magnetic field detector such as e.g. a coil, a magnetic head, a sound head, a field plate or the like.

For the same reasons electrically conducting inserts or imprints are excluded as a feature for inconspicuous and rapid checking. Additionally generally a stroke with a pencil serves to imitate such a feature.

Security papers with optical authenticity features have already become known in the automatic testing of which neither exact positioning nor close contact with the testing apparatus is necessary.

In a first group of such features the local absorption at wavelengths in the infrared or the ultraviolet spectral regions is tested; the papers are for this purpose provided by suitable means already during their manufacture with transmission patterns. If one does not wish to take on the disadvantage of a large surface print into the costs then in the examination of such security papers one must carry out a difficult pattern recognition. Accordingly the range of application is already much restricted.

A known marking of this type can also be imitated with substances which are likewise available in commerce.

In a second group of optical features the fluorescence emission of characteristic materials is used for giving authenticity checking.

Rendering security papers secure against forgery by means of luminescing substances has already been known for a long time. Already in German Patent Specification No. 449133 from the year 1925 and German Patent Specification No. 497039 from the year 1926 the introduction of luminescing substances into security papers is described, wherein the luminophores used therein can be excited with ultraviolet or other invisible rays and emit in the visible region.

In U.S. Pat. Nos. 3,473,027 and 3,525,698 luminophores and their use as coding dyestuffs on the basis of host lattices doped with rare earth metals which if appropriate can be co-activated, are described, in which the excitation takes place in the UV-region and in the short wave visible region and the emissions in the near IR-region find use for broadening the usable spectral range.

In German Offenlegungsschrift No. 2547768 codoped rare earth metal luminophores are described which are excited in the IR-region and emit in the visible region.

The use of luminophores for rendering data carriers secure is further described in German Offenlegungsschrift No. 1599011 as well as in German Offenlegungsschrift No. 2903073, wherein the luminous materials theredescribed are stimulated in the IR-region.

In the patent literature and the scientific literature a very great number of different rare earth metal luminophores are described which as single crystals are suitable for solid body lasers or for other uses. For example attention can be directed to U.S. Pat. Nos. 3,447,851 and 3,480,877 in which crystals with garnet structure are described for laser techniques, but the rendering of security papers secure with luminophores is not mentioned.

From the state of the art concerning rendering security papers secure with luminescing substances it can be concluded that the excitation of the luminophore preferably takes place in the UV- or in the IR-region while the emission is either desired or not seen to be damaging in the visible spectrum (VIS).

All luminescence materials noted in the literature in connection with rendering security papers secure also have at least additionally emission in the VIS. Thereby the marking becomes recognizable on corresponding excitation; further all IR-luminophores known in connection with rendering security papers secure emit in a spectral region which can be investigated with commercially normal image converters.

The luminophores are in the case of single layer security papers worked in as paper additions, paper inserts, for example as mottling fibres or security threads, or printing inks.

It has emerged that in rendering security papers secure using rare earth metal luminophores difficulties arise on account of the properties of the same which are described in the following. In the more recent publications, in most cases "data cards" are described, i.e. generally multi-layer security papers, in which these difficulties can be avoided.

One of the difficulties in rendering security papers secure, particularly in rendering security papers secure using printing inks using rare earth metal luminophores, arises from their particle size. In the publications already noted above namely U.S. Pat. No. 3,473,027 and German Offenlegungsschrift No. 2547768 particle sizes of a few $\mu m$ upwards are noted. For normal printing pigments, however, particle sizes below 1 $\mu m$ are necessary. Normal previously used rare earth metal luminophores no longer show sufficient effectiveness below a certain particle size, so that on being comminuted the luminescence intensity is substantially lost. They must accordingly be introduced in large quantities; this gives rise to high costs and often leads to insoluble technological problems, since for this the limit of loading the printing ink with additional materials has to be exceeded.

For avoiding these difficulties in relation to particle size, partially soluble organic rare earth metal luminophores are described which, however, because of their nature do not have the solvent fastness necessary for bank note printing.

In rendering security papers secure up till now particular value has been laid on the fact that on excitation in the UV-region or IR-region luminescence arose in the visible region or in the near IR-region easily accessible with commercially available image converters. In automatic authenticity checking of securing papers however it constitutes an additional security factor if the rendering secure is not visible or it is not possible to make this visible with normal means.

In German Offenlegungsschrift No. 15 99 011 for masking inscriptions covering with a foil has already been proposed. Apart from the fact that the foil itself is visible and thereby directs attention particularly to the place of the inscription, use of foils in the case of bank notes and similar security papers is not practicable.

SUMMARY OF THE INVENTION

The object of the invention is the creation of security papers with a security in the form of luminescing substances which are as difficult as possible to recognize and which in particular show no emission in the visible spectral region and the authenticity of which can be determined rapidly and automatically without being noticed.

The object of the invention is further to develop a corresponding test process for the unnoticed rapid and automatic authenticity testing of these features.

The realisation which underlies the invention is that this object can be solved in that by combination of luminophores with suitable absorbing materials all luminescence emissions in the visible region of the optical spectrum are suppressed and that the testing device can be hidden behind a nontransparent plate which is translucent for the excitation and emission radiation. This plate can both appear dark or black or also can be constructed as a mirror e.g. as a coloured mirror.

BRIEF DESCRIPTION OF THE DRAWINGS

The above and further objects of the present invention will become more readily apparent as the invention is more completely understood from the detailed description given below, reference being had to the accompanying drawings in which like reference numerals represent like parts throughout and in which.

DETAILED DESCRIPTION OF THE PREFERRED EMBODIMENTS

Figure 1:
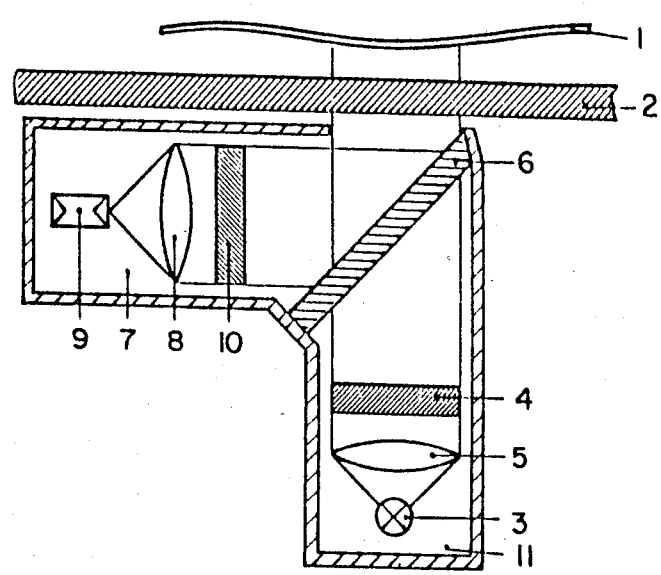
FIG. 1 is a schematic representation of a test apparatus according to the present invention.

The subject of the invention is a security paper with authenticity characteristics in the form of luminescing substances wherein the luminescing substances are so constructed that they show luminescence emissions only in the invisible region of the optical spectrum, wherein the excitation can likewise be undertaken with the invisible light.

By the "invisible region of the optical spectrum" we understand in agreement with the technical literature the wavelength region less than 400 nm and greater than 750 nm.

Properties according to the invention can be achieved for example by combination of a luminophore with one or more suitably absorbing materials or by the use of rare earth metal luminophores in suitable absorbing host matrices.

The special measures for the suppression of so-called "parasitic" luminescence emissions in the visible are an important component of this invention. Advantageous developments of the invention are to be taken from the sub-claims.

Particular advantages of this invention are:

Testing signal and authenticity signal have no components which can be directly perceived by the human senses and the testing apparatus is so constructed that it remains hidden to the observer even during the testing process; the testing of the security paper can accordingly take place in the presence of persons and despite this unnoticed by them in normal lighting.

The imitation of the authenticity feature is in the case of many of these materials very difficult and in some of them almost impossible.

The possibilities for construction of the feature can be divided into 4 groups depending upon excitation and emission 1. Excitation UV—Emission UV A marking of security papers with luminescence materials which are excited in the UV and emit in the UV can be undertaken with black light phosphors known per se -doped alkaline earth phosphors or -silicates or -sulphates.

Suitable materials are individually listed in P. Pringsheim, M. Vogel: Luminescence of Liquids and Solid Bodies, Verlag Chemie, Weinheim 1951, page 209, Table XXIII b and page 202, Table XXI, Position 5.

As examples we note further:

Cerium-activated calcium phosphate $Ca_3(PO_4)_2$: Ce or lead-activated barium fluorosilicate $BaFSiO_3$: Pb.

In addition to this there is still a number of organic luminescence materials with which security papers can be provided for this purpose.

We note here pyrene and naphthalene and additionally direct attention to the collection of further suitable materials in: Landolt-Bornstein: New Series II/3 (1967).

2. Excitation UV—Emission IR

For the characterisation of security papers with luminescence materials which after excitation with UV emit in the IR, one uses ions of rare earth metals which are installed in suitable host lattices. Such host lattices, such as e.g. lanthanum fluoride $LaF_3$, lanthanum chloride $LaCl_3$, are doped up to concentrations of 5% and more with ions of rare earth metals such as praseodymium, neodymium, cerium, samarium, europium, terbium, dysprosium, holmium, erbium, thulium or ytterbium.

We direct attention in addition to the collection of further suitable materials in: Dieke "Spectra & Energy Levels of Rare Earth Ions in Crystals" Interscience N.Y. 1968, Chapter 13, pages 189 ff.

3. Excitation IR—Emission UV

Basically one can also characterise security papers with luminescence materials which on excitation in the IR show a luminescence emission in the UV. For security papers which are to be subjected to high requirements, e.g. bank notes, this embodiment of the invention has restricted application, since the intensity of luminescence emission is relatively small. Use is only sensible in less rigorous security papers and requires correspondingly substantial testing apparatus.

For this embodiment of the invention suitable feature materials which show the unusual properties of emitting radiation more rich in energy than the impinging radiation are the ions of rare earth metals in host lattices already spoken of above. The host lattice in this case couples two absorbed IR-photons to the rare earth metal ion, which then gives up its excitation energy by emitting a single UV photon again.

Suitable materials and their properties are listed e.g. in: Auzel "Proceedings of the IEEE Volume 61,6 (1973) page 769. We name as an example ytterbium, erbium-doped yttrium oxychloride $Y_2OCl_7:Yb^{3+}:Er^{3+}$ with UV emission lines at 380, 320 and 305 nm on excitation in the IR between 950 and 1050 nm.

4. Excitation IR—Emission IR

In the case of single layer documents, e.g. in bank notes, the characterisation with luminescence materials which following irradiation by IR show a luminescence emission in the IR gives conspicuous advantages. Both the paper and also the printing inks used in making the security paper have in the IR a higher transmission than in the UV. This advantage is strengthened by the high effectiveness of the light sources available for use which are additionally easier to come by than the corresponding UV light sources.

There are corresponding luminescence materials in large number.

Suitable organic compounds are set forth in: Applied Phys. Letters, Vol. 12, page 206. We name as an example: Cresyl Violet.

Suitable inorganic compounds are again individual ones of the already noted ions of rare earth metals in organic and inorganic host lattices.

The further description of the invention can take place in common for all four embodiments.

The suppression of not desired emissions in the visible region can take place by the use of absorbing substances which absorb in each wavelength region in which the luminophore has an undesired emission. For this purpose there are suited in particular dyestuffs and coloured pigments. Preferably the luminophore is embedded in the absorbing substances.

Luminophore and absorbing substances can however also be applied as a mixture or on or into the security paper as layers lying one on another.

Alternatively the luminophore can be added in admixture with an absorbing printing ink or introduced into the paper or applied to a security thread foil. The absorbing material can if desired be present dissolved in a varnish. Furthermore the possibility of covering the printed image which was made with a printing ink containing the luminophore with the absorbing substance e.g. by a second printing process must also be considered.

An alternative possibility of suppressing not desired emissions in the VIS-region consists in the use of suitable absorbing host lattices for rare earth metal luminophores.

Preferably these host lattices have a perovskite or garnet structure.

By perovskites are to be understood here compounds of the general formula $$AXO_3$$

wherein

A represents scandium, yttrium, lanthanum, a lanthanide of atomic number 58 to 71 and/or bismuth, and X represents one or more absorbing transition metals preferably cobalt, nickel, manganese or iron.

As already mentioned, the host lattice can be a mixed lattice of an absorbing and a non-absorbing lattice of the same structure, i.e. the absorbing transition metal X can be replaced partly by other elements.

Particularly in question here are trivalent elements such as aluminium, gallium, indium and scandium as well as tetravalent together with divalent elements such as silicon or germanium with calcium, magnesium and/or zinc.

As garnets there are particularly to be noted also compounds of the subsequently set out general formulae F1 to F4:

$$A_3X_{5-2x}M_xM'_xO_{12} \qquad (F1)$$

$$A_{3-x}B_xX_{5-x}M_xO_{12} \qquad (F2)$$

$$A_3Fe_{5-x}M_xO_{12} \qquad (F3)$$

$$A_{3-2x}B_{2x}X_{5-x}V_xO_{12} \qquad (F4)$$

In this

A denotes in all cases: yttrium, scandium, the lanthanides with the exception of praseodymium and neodymium. The latter elements can, however, be present as components of a mixture. As components of a mixture bismuth and lanthanum are also possible, X in all cases: an element from the group iron, aluminium, gallium and indium, M' an element from the group silicon, germanium, tin and zirconium, M in the case of F1: an element from the group iron, cobalt, nickel, manganese and zinc, in the case of F2: an element from the group silicon, germanium, tin, tellurium, zirconium and titanium, in the case of F3: an element from the group aluminium, gallium, indium and chromium, B an element from the group magnesium, calcium, strontium, barium, manganese, zinc and cadmium.

As the formulae F1, F2 and F4 show, the formation of "mixed garnets" is not only restricted to the mutual replacement of elements of degree of oxidation 3. In the case of F1 and F2 both divalent and also tetravalent elements together are built into the lattice whereby by the stoichiometry given the necessary charge equilibrium is obtained; in the case of F4 the same goes for the introduction of divalent and pentavalent elements; in contrast F3 describes the exchange of iron by trivalent elements for which no charge equilibrium has to result.

The index x can take values between 0 and at most 5, wherein this value is limited by the stoichiometry and it must be made certain that an absorbing component is present. Preferred examples of "mixed garnets" for cases F1 to F4 are:

| | |
|---|---|
| $Y_3Fe_4Ni_{0.5}Ge_{0.5}O_{12}$ | For (F1) |
| $Y_2CaFe_4SiO_{12}$ | For (F2) |
| $Y_3Fe_3Al_2O_{12}$ | For (F3) |
| $Y\,Ca_2Fe_4VO_{12}$ | For (F4) |

It is self-evident that these lattices in order to achieve luminescence must still be doped with the ions of the rare earth metals.

A further suitable group of compounds are ferrites doped with rare earth metals of the general formula $$M_{1-x}^{2+}M'_x{}^{3+}Fe_x{}^{2+}Fe_{2-x}{}^{3+}O_4,$$

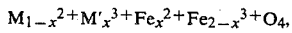

wherein M stands for one or more divalent metals from the group indium, cadmium, cobalt, manganese, iron, nickel, copper, magnesium and M' for one or more trivalent lanthanides (atomic number 58-71) such as ytterbium, erbium, thulium, dysprosium, holmium, gadolinium or samarium. In this case for charge compensation the trivalent iron is more or less replaced by iron of degree of oxidation 2 so that the index x can take up values between 0 and 1.

In contrast to rare earth metal luminophores with transparent host lattices which have found diverse applications and are broadly spread, the use of rare earth metal luminophores with host lattices absorbing in the VIS has previously only been proposed for lasers.

However this proposal found no technical application. For this reason commercially normal availability of the luminescing substances used in the security papers according to the invention is prevented.

In normal "transparent" i.e. little absorbing crystalline rare earth metal luminophores for effective excitation and emission comparatively large crystals are necessary.

With small particle sizes the effectiveness rapidly sinks and with particle sizes below 1 μm has sunk to impracticably low values. In the strongly absorbing rare earth metal luminophores used in the security papers according to the invention the excitation takes place as such only in a comparatively thin layer. The comminution of the crystals below 1 μm does not accordingly diminish the effectiveness. The luminophores can on the basis of their small particle size be used in simultaneous printing and steel gravure printing inks.

It is not necessary that the host lattice absorbs completely over the whole visible region. Rather it is sufficient that the absorption takes place in each region where there can arise an emission lying in the visible or if desired in the near IR. Also a diminished absorption of the host lattice in particular spectral regions is sufficient so long as it is ensured that by the absorption of the host lattice possible emissions are avoided. The desired properties of the luminophores are in each case then present if in the visible no emissions arise and accordingly the security is "invisible" or cannot be observed with normally commercial devices.

Accordingly the host lattice can also in the fashion described above be a mixed lattice of an absorbing and a non-absorbing lattice of the same structure, i.e. the absorbing transition metal X can partly be replaced by other elements. The properties of suppression of luminescence in the visible region and the excitation spectrum matched to the strong light sources remain maintained.

The absorption of the material becomes less and this enables it also to be used as an additive material for lighter colouring tones. The, if appropriate, less effectiveness of the less absorbing luminophore is compensated for by the less damaging absorption of the lighter colouring material. Dark colours take much more excitation light away, i.e. one needs for rendering the same secure very effective strongly absorbing dark luminophores.

The active dopants are rare earth metals particularly elements with an atomic number of 58 to 71, which have emission lines in the UV- or IR-region. Preferred dopants are individual ones or several of the materials erbium, holmium, thulium, dysprosium.

If the security paper is constructed as a single layer, e.g. as a bank note, then the luminescence material can be incorporated by addition to the pulp but if on the other hand a multi-layer laminate is present as a security paper e.g. as a credit card then the feature material can be introduced by the use of a paper prepared during its manufacture as an inner layer of the laminate; a further possibility is the introduction of the luminescence material between two laminate layers.

For the application of the luminescence material to the surface of the finished document there are suited known printing processes e.g. offset printing, letterpress printing, gravure printing and screen printing.

Preferred in the security papers according to the invention are those luminescing substances which are solvent fast and which correspond to all of the resistance tests prescribed in relation to bank note inks. In the case of less high requirements concerning resistance however naturally also other materials which do not fullfil all these requirements normal in bank note manufacture can be used.

Security paper according to this invention is secured to a high degree against forgery; in this connection the degree of security depends on the particular choice of the luminescence material. With corresponding effort, forgery can be made more difficult as desired.

The highly restricted availability of the chosen material is in this connection not the sole determinant. The high quantum yield of the luminescence materials which can be used allows the feature material to be used in such small quantities that chemical analysis for the identification can only be undertaken with substantial apparatus, e.g. with mass spectrometers.

Security paper according to the invention sends following excitation by an invisible optical test signal a likewise invisible optical authenticity signal out. Because visible light does not disturb it, the testing can be carried out in normal lighting.

In many areas of application it is advantageous to carry out the testing in the presence of persons but unnoticed by them. Then it is obvious that also the test device should be constructed invisibly.

This is achieved if the same is hidden behind a non-transparent plate which at the same time is transmissive for the invisible test signal as well as for the likewise invisible authenticity signal.

Such plates can be effected in two ways by absorbing materials and also by reflective particularly mirror materials.

Examples for suitable absorbing material are Woods glasses, tempering glasses, dichroic materials, germanium slices, silicon slices and plastics foils or plastics plates which contain suitable absorbing material as filler. Examples for suitable reflective or mirror non-transparent plates are interference filters, cold light mirrors and polished germanium or silicon discs.

The positioning of the security paper in the test apparatus is non-critical since generally no pattern determination needs to be carried out. Thereby the requirements for unobserved automatic test are given.

A suitable test device is schematically illustrated in FIG. 1. It can be used for authenticity control of security papers according to the invention in all embodiments. The security paper 1 in this lies on a non-transparent black or reflecting plate 2 which is set unnoticeably into the table surface e.g. at a bank counter as a payment tray or as the carrier for an advertising legend. The positioning of the security paper and its distance from the plate are not critical since the range of tolerance lies in the order of cm.

The plate 2 absorbs wholly in the visible region but is however transparent for the invisible test light and also for the invisible luminescence light demonstrating the authenticity. Below the security paper 1 introduced into the test apparatus and separated from this by the plate 2 lies the lamp region 11. The test light is generated there by the light source 3 and spectrally limited by means of the filter 4. By means of this it passes through the illumination optics 5, crosses the beam splitter 6 and non-transparent plate 2 and then falls on the security paper 1. If the document is genuine and contains the characteristic luminescence materials, it emits luminescence light with a particular spectral distribution. The light emitted passes again through the plate 2 and falls on the beam splitter 6.

The luminescence light radiated from the security paper 1 in the region of the detector 7 crosses the detector optics which focusses the luminescence light on to the active surface of the detector 9. In front of the detector optics 8 and detector 9 a detector filter 10 is introduced into the beam path; this takes care that stray light from the light source 3 cannot fall on to the detector 9. The filter 10 is so constructed that it only allows through wavelengths characteristics for the luminescence of the feature material. The detector 9 accordingly only receives light when the security paper to be tested has the expected authenticity features. In this case by means of a suitable electrical circuit a signal emitter is activated which emits a well recognisable preferably optical signal which is recognisable by the cashier but not the customer. Depending on the particular use one can choose whether the signal is emitted on a positive or negative outcome of the test.

Figure 2:
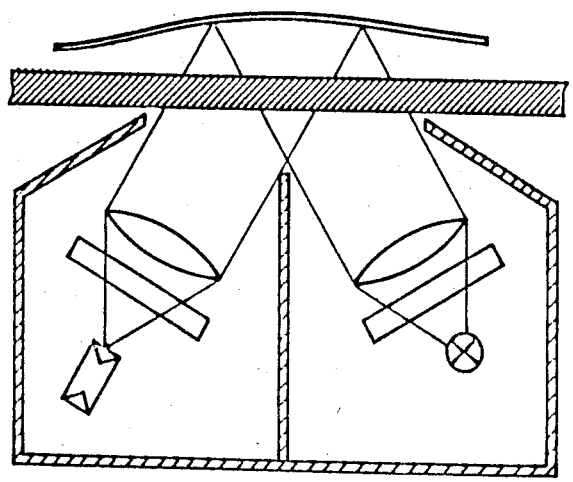
FIG. 2 is a schematic representation of a second embodiment of a test apparatus according to the present invention.

FIG. 2 shows schematically test apparatus in another more simple embodiment in which one does without a beam splitter. For this however one must use in any case a test signal which depends on the distance of the security paper from the black glass plate.

The test devices previously described identify particular luminescence materials with high security and are characterised by simple construction. If one sets very high requirements for the identification of the feature material, then the test device can also be matched to these requirements.

In this connection the basic construction of the test device—black glass plate, beam splitter, illumination region and detector region on both sides of the beam splitter—is maintained. The changes are limited to the construction of the illumination chamber 11 and the evaluation electronics. These parts can be so constructed as taught in German Offenlegungsschrift No. 2645959 of the same Applicant.

The radiation from the light source is sent through the rotating disc which is fitted with two sorts of filter. Grey filters alternate with filters which contain the feature material and accordingly substantially damp the test light in material specific fashion. Depending on whether the grey filter or the special filter set to the genuine material is located in the path of the beam and in each case depending on whether a "genuine" or a "false" luminescence material is present for testing, the probe emits luminescence light of corresponding intensity. From this with the aid of the evaluation electronics described in German Offenlegungsschrift No. 2645959 exceptionally secure identification of a particular feature material can be undertaken.

The filters and light sources to be used in the test apparatus must naturally be dependent upon the feature material. An introduction as to how this can take place for the various groups of materials is given in Table 1.

Both the feature itself and also the checking apparatus in the sence of the invention can, as indicated, be matched within wide limits to particular requirements which are set from case to case in respect of rendering authentic security papers and they thus make possible solutions which are both matched to the problem and economic.

Naturally apart from the new types of checking apparatus described here all known processes for checking visible luminescence in changed form can be used.

Suitable luminophores for the security papers according to the invention and their manufacture are subsequently described in more detail with reference to Examples.

EXAMPLE 1

Manufacture of an erbium-doped mixed garnet of the formula $Y_{2.8}Fe_4InO_{12}:Er_{0.2}$ as an example for a rare earth metal luminophore according to the invention having a host lattice absorbing in the VIS.

63.22 g yttrium oxide $Y_2O_3$, 7.65 g erbium oxide $Er_2O_3$, 64 g iron oxide $Fe_2O_3$, 27.76 g indium oxide $In_2O_3$, 60 g anhydrous sodium sulphate $Na_2SO_4$ were intimately mixed and heated for 6 hours to 850° C. in an aluminum oxide crucible, milled again and heated for a further 14 hours to 1100° C.

After cooling the reaction product was comminuted, the fluxing agent washed out with water and the residue dried at 100° C. in air. For obtaining the highest possible particle fineness the powder was then milled in a stirring ball mill. A light green powder with an average particle size less than 1 μm was obtained.

Figure 3:
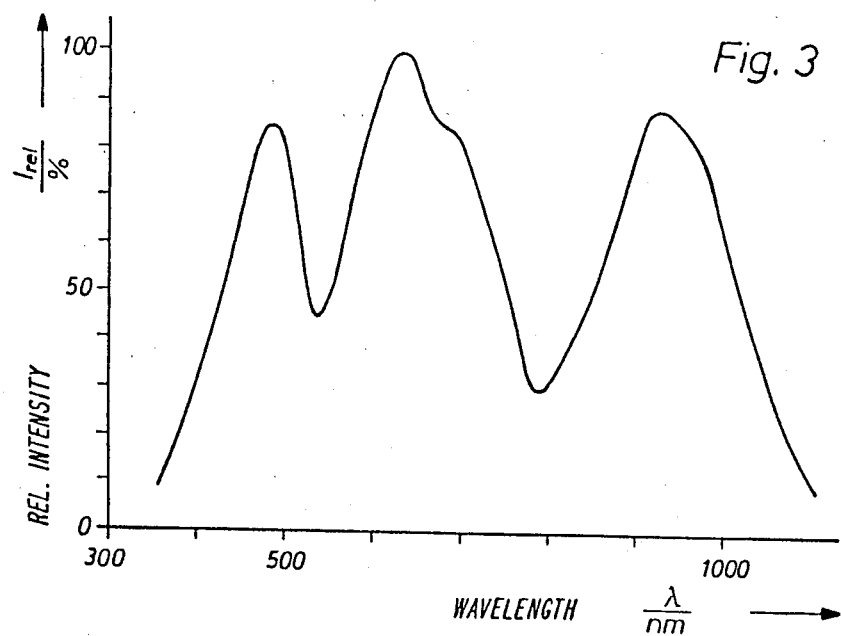
Figure 4:
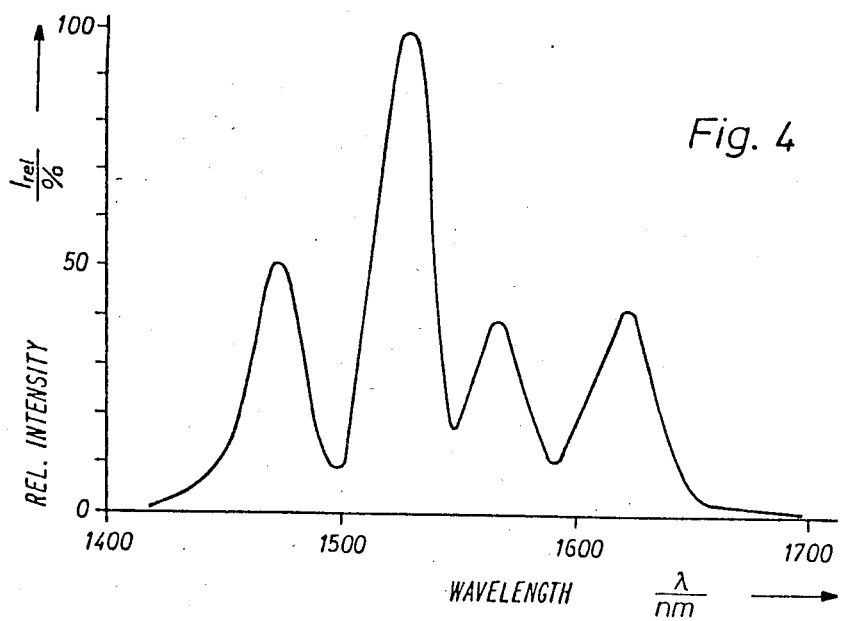

On any excitation this luminophore, which has an excitation spectrum evident from FIG. 3, shows no luminescence in the visible range but on excitation according to FIG. 3 an emission, the spectral distribution of which is represented by FIG. 4 and which is characterised by a strong luminescence at about 1.5 μm in the IR-region where the host lattice is optically transparent. The luminophore is suited accordingly predominantly for authenticity characterisation of security papers in a non-visible and unnoticeable way.

In contrast all normal erbium-doped luminophores with a transparent host lattice have a green luminescence at 0.52 to 0.55 μm. In the luminophores used according to the invention this green luminescence does not arise because of the host lattice absorbing in the visible region. The remaining infrared luminescence at about 1.5 μm is more intensive than with normal transparent host lattices. This fluorescence also lies outside the near IR-region accessible with commercial image converters.

EXAMPLE 2

Manufacture of thulium-activated yttrium vanadate of the formula $Y_{0.95}Tm_{0.05}VO_4$ as an example for a luminophore coated with a suitable absorbing substance with properties according to the invention.

215 g yttrium oxide $Y_2O_3$ were intimately mixed with 19.3 g thulium oxide $Tm_2O_3$ and 234 g ammonium metavanadate $NH_4VO_3$ and the resulting mixture heated in air for two hours to 800° C.

The product was milled to a particle size of 2 μm.

The luminophore showed strong narrow band emissions at 480 nm and 800 nm.

This luminophore was then embedded in a synthetic resin coloured with Permanent Red R Extra. For this 8 g of the luminophore were mixed with 60 g isophorone diisocyanate, 34 g toluene sulphonamide and 20 g melamine in a heatable kneader at 140° C., whereon by exothermic reaction with a temperature rise to 200° C. a brittle solid body arose. The product was polymerised out for a further 30 minutes at 180° C. and then milled.

Figure 5:
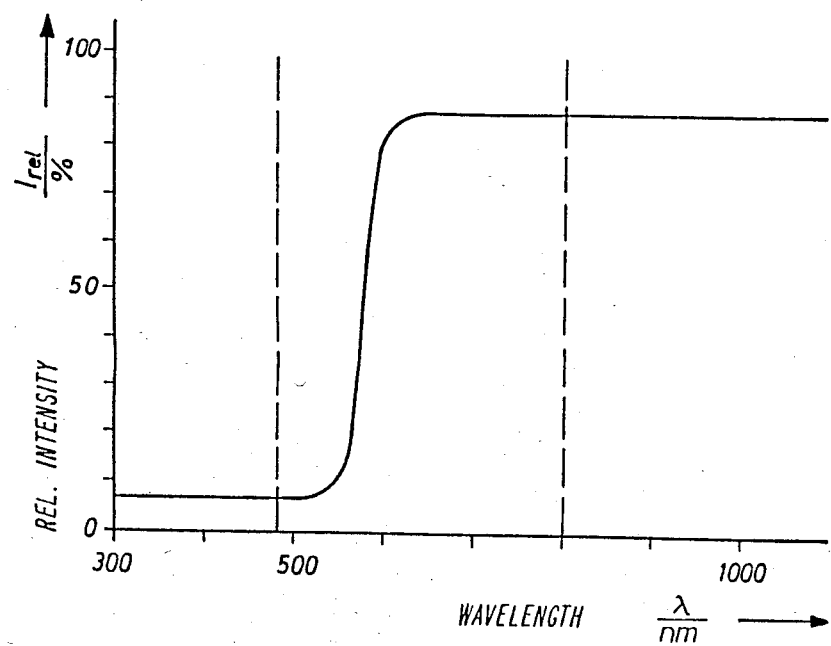

In FIG. 5 the remission spectrum of the dyestuff "Permanent Red R Extra" (trade mark of the film Hoechst AG) is represented. Also the narrow band emissions of the luminophore are noted. By the combination of luminophore and dyestuff the emission at 480 nm is suppressed and only the emission at 800 nm can be observed.

There is no difficulty for the man skilled in the art on the basis of the preceding description to provide further recipes for the manufacture of substances luminescing according to the invention.

TABLE 1

| | UV → UV | UV → IR | | IR → UV | IR → IR |
|---|---|---|---|---|---|
| Non-transparent plate | Woods Glasses, e.g. Glass types | UG 1<br>UG 5<br>UG 11 | | | Tempering Glasses<br>e.g. Glass types<br>RG 715<br>RG 780<br>RG 830<br>RG 850 |
| absorbing (black) | Semi-conductors such as germanium, selenium, silicon etc., dichroic filters, foils or plastics plates with absorbing fillers | | | | |
| Reflecting (mirror) | Interference filters, cold light mirrors, polished Si or Ge discs | | | | |
| Lock filter | Glass or interference filters depending upon the feature material used | | | | |
| Detector | Photo-Multiplier<br>Si-Photodiodes | 700–850 nm Photo-multiplier<br>700–1100 nm Si-Photo diode<br>700–1600 nm Ge-Photodiode<br>700–3000 nm PbS-Photoresistance<br>700–3500 nm InAs-Photoresistance<br>2–13 μm HgCdTe-Photoresistance<br>2–6 μm InSb-Photoresistance | | Photo-multiplier<br>Si-Photo diodes | 700–850 nm Photo-multiplier<br>700–1100 nm Si-Photo diode<br>700–1600 nm Ge-Photodiode<br>700–3000 nm PbS-Photoresistance<br>700–3500 nm InAs-Photoresistance<br>2–13 μm HgCdTe-Photoresistance<br>2–6 μm InSb-Photoresistance |
| Light Source | Mercury Vapour Lamps, Flash Lamps | | | Incandescent Lamps Spectral Lamps, Discharge Lamps | Light emitting Diodes Arc Lamps |
| Beam Splitter | Interference Beam Splitters, Neutral Beam Splitters | | | | |

What is claimed is:

1. A process for testing the authenticity of security documents secured with a luminescing substance without attracting attention, comprising:
   exciting the security document with light from the invisible region of the optical spectrum; and
   sensing luminescence light emitted from said security document in the invisible region of the optical spectrum;
   wherein the exciting and sensing steps are performed through a plate which is separate from said security document and opaque to visible light but which allows both excitation light and also luminescence light to pass through; and
   wherein said exciting step is carried out by an exposure unit and said sensing step is carried out by a sensing unit and further including positioning said exposure unit and said sensing unit behind said plate so as to hide said exposure unit and said sensing unit from view.

2. A process according to claim 1, wherein the exciting step comprises using UV-light for excitation of the luminescing substance and the sensing step comprises evaluating only light from the ultraviolet region of the optical spectrum.

3. A process according to claim 1, wherein the excitation step comprises using UV-light for excitation of the luminescing substance and the sensing step comprises evaluating only light in the infrared region of the optical spectrum.

4. A process according to claim 1, wherein the excitation step comprises using IR-light for excitation of the luminescing substance and the sensing step comprises evaluating only light in the ultraviolet region of the optical spectrum.

5. A process according to claim 1, wherein the excitation step comprises using IR-light for excitation of the luminescing substance and the sensing step comprises evaluating only light in the infrared region of the optical spectrum.

6. A device for testing the authenticity of security documents secured with a luminescing substance without attracting attention, comprising:
an exposure unit for exciting the security document with light from the invisible region of the optical spectrum;
a detector unit for sensing luminescence light emitted from the security paper in the invisible region of the optical spectrum; and
a plate separating said exposure unit and said detector from a security document being tested, said plate being separate from said security document, opaque to visible light and allowing both excitation light and also luminescence light to pass through.

7. A device according to claim 1, wherein said plate reflects little visible light and appears black.

8. A device according to claim 7, wherein said plate comprises a Woods glass.

9. A device according to claim 7, wherein said plate comprises a tempering glass, the absorption edge of which lies outside the visible region of the optical spectrum.

10. A device according to claim 7, wherein said plate comprises dichroic material.

11. A device according to claim 7, wherein said plate comprises a plastic foil or plastic plate which contains suitable absorbing material as filler.

12. A device according to claim 6 wherein said plate strongly reflects visible light particularly specular and appears as a mirror.

13. A device according to claim 12, wherein said plate appears as a colored mirror.

14. A device according to claim 12, wherein said plate comprises semi-conductor material such as silicon or germanium.

15. A device according to claim 12, wherein said plate comprise a cold light mirror.

16. A device according to claim 12, wherein said plate comprises an interference filter.

17. A device according to claim 6 wherein said plate is positioned to hide said exposure unit and said detector unit from view.

* * * * *